(12) United States Patent
Bounaim et al.

(10) Patent No.: US 9,341,728 B2
(45) Date of Patent: May 17, 2016

(54) METHODS OF ANALYZING SEISMIC DATA

(71) Applicant: WESTERNGECO L.L.C., Houston, TX (US)

(72) Inventors: Aicha Bounaim, Hafrsfjord (NO); Oda Roaldsdotter Ravndal, Stavanger (NO); Jarle Haukås, Sola (NO)

(73) Assignee: WESTERNGECO L.L.C., Houston, TX (US)

( * ) Notice: Subject to any disclaimer, the term of this patent is extended or adjusted under 35 U.S.C. 154(b) by 182 days.

(21) Appl. No.: 13/952,831

(22) Filed: Jul. 29, 2013

(65) Prior Publication Data
US 2015/0030209 A1   Jan. 29, 2015

(51) Int. Cl.
G01V 1/30 (2006.01)
G01V 1/34 (2006.01)

(52) U.S. Cl.
CPC .............. G01V 1/301 (2013.01); G01V 1/345 (2013.01); G01V 2210/66 (2013.01)

(58) Field of Classification Search
CPC .... G01V 1/301; G01V 1/345; G01V 2210/66
See application file for complete search history.

(56) References Cited

U.S. PATENT DOCUMENTS

| | | | |
|---|---|---|---|
| 7,248,539 B2 | 7/2007 | Borgos et al. | |
| 7,355,597 B2 * | 4/2008 | Laidlaw ................. | G06T 15/08 345/419 |
| 2003/0023383 A1 | 1/2003 | Stark | |
| 2003/0112704 A1 | 6/2003 | Goff et al. | |
| 2005/0171700 A1 | 8/2005 | Dean | |
| 2010/0121623 A1* | 5/2010 | Yogeswaren ..................... | 703/2 |
| 2011/0106507 A1* | 5/2011 | Lepage ............................. | 703/2 |
| 2011/0205844 A1 | 8/2011 | Maucec et al. | |
| 2013/0090857 A1* | 4/2013 | Imhof et al. .................... | 702/14 |
| 2013/0238297 A1* | 9/2013 | Lepage et al. .................... | 703/2 |

OTHER PUBLICATIONS

Bhalerao et al., "Tensor Splats: Visualising Tensor Fields by Texture Mapped Volume Rendering", MICCAI 2003, LNCS 2879, 294-302.*
Caviedes et al., "User Interfaces to Interact with Tensor Fields. A State-of-the-Art Analysis", Similar NoE Tensor Workshop, Las Palmas, Nov. 2006.*
Kindlmann et al., "Strategies for Direct Volume Rendering of Diffusion Tensor Fields", 2000 IEEE Transactions on Visualization and Computer Graphics, vol. 6, No. 2, 124-138.*
Zheng et al., "Topological Lines in 3D Tensor Fields", IEEE Visualization 2004, 313-320.*
International Search Report and Written Opinion for corresponding PCT Application Serial No. PCT/IB2014/063477 dated Oct. 23, 2014, 7 pages.

* cited by examiner

*Primary Examiner* — Katrina Fujita

(57) ABSTRACT

A method of analysing seismic data from a geological volume is provided. The geological volume is divided into a plurality of voxels. For each voxel a respective neighbourhood is defined which includes that voxel and a predetermined arrangement of neighbouring voxels. For each voxel, the respective normal vectors of a seismic attribute vector field derived from the seismic data are calculated. For each voxel, a respective local structure tensor based on the normal vectors of the voxels of the respective neighbourhood is calculated. For each voxel, the value of an expression which includes one or more of the eigenvalues ($\lambda_1$, $\lambda_2$, $\lambda_3$) of the respective local structure tensor is calculated. The method can be used for seismic surveying, or to manage operation of or drilling of a subterranean well.

15 Claims, 12 Drawing Sheets

$\lambda_1 \geq \lambda_2 \approx \lambda_3$  $\lambda_1 \approx \lambda_2 \geq \lambda_3$  $\lambda_1 \approx \lambda_2 \approx \lambda_3$
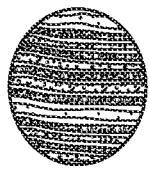  
FIG.4A    FIG.4B    FIG.4C
PLANE-LIKE      LINE-LIKE       ISOTOPIC-LIKE
$\lambda_1 \geq \lambda_2 \approx \lambda_3$    $\lambda_1 \approx \lambda_2 \geq \lambda_3$    $\lambda_1 \approx \lambda_2 \approx \lambda_3$
C = 1           $C_p$ = 1         $C_s$ = 1
FIG.5
$C_s$ = 1
$C_l$ = 1                                   $C_p$ = 1
FIG.6

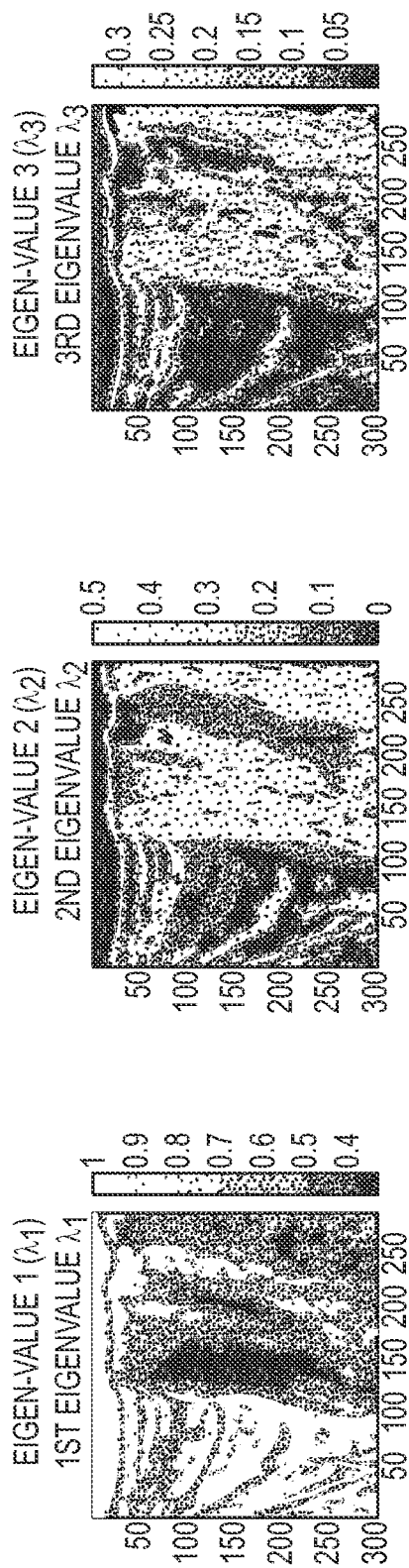
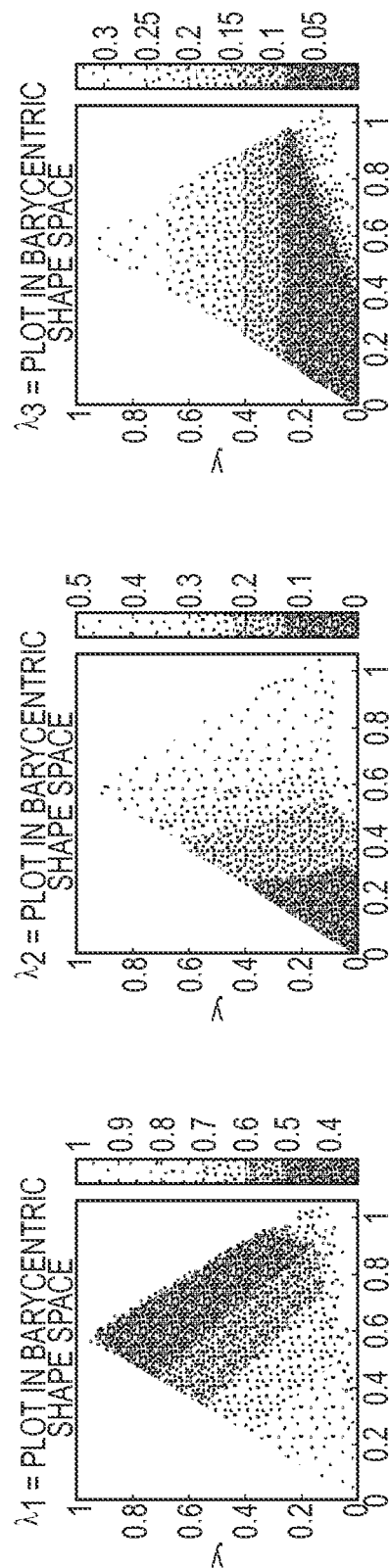
FIG. 11C
FIG. 11B
FIG. 11A

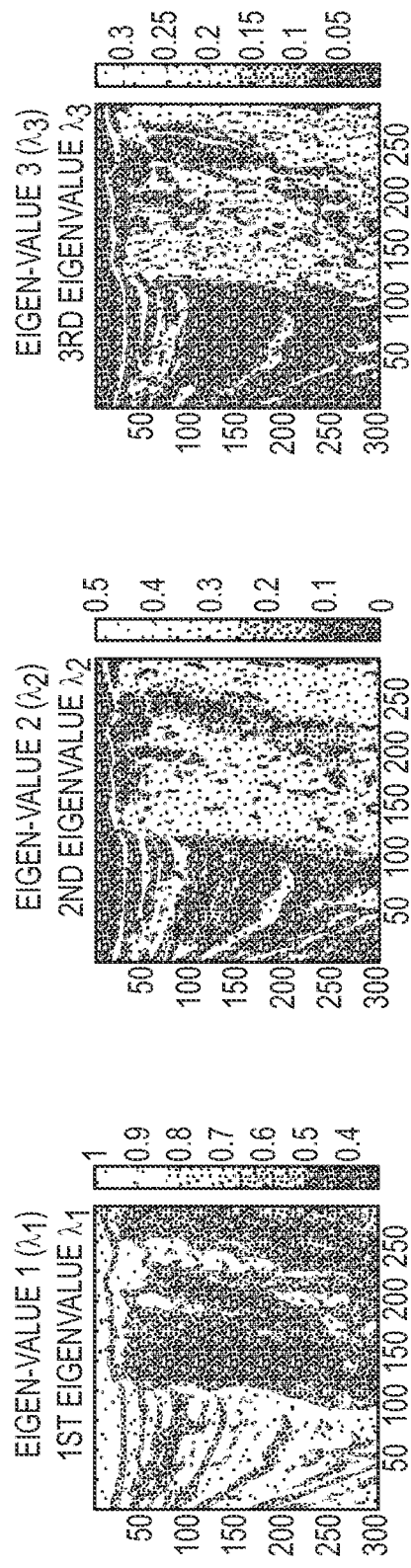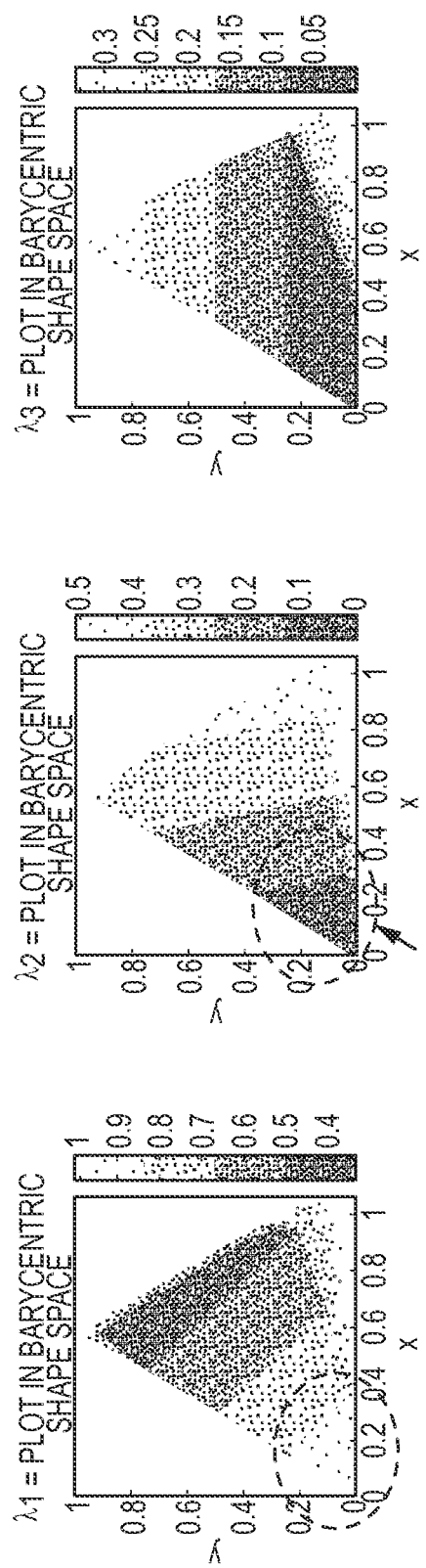
FIG. 12A  FIG. 12B  FIG. 12C

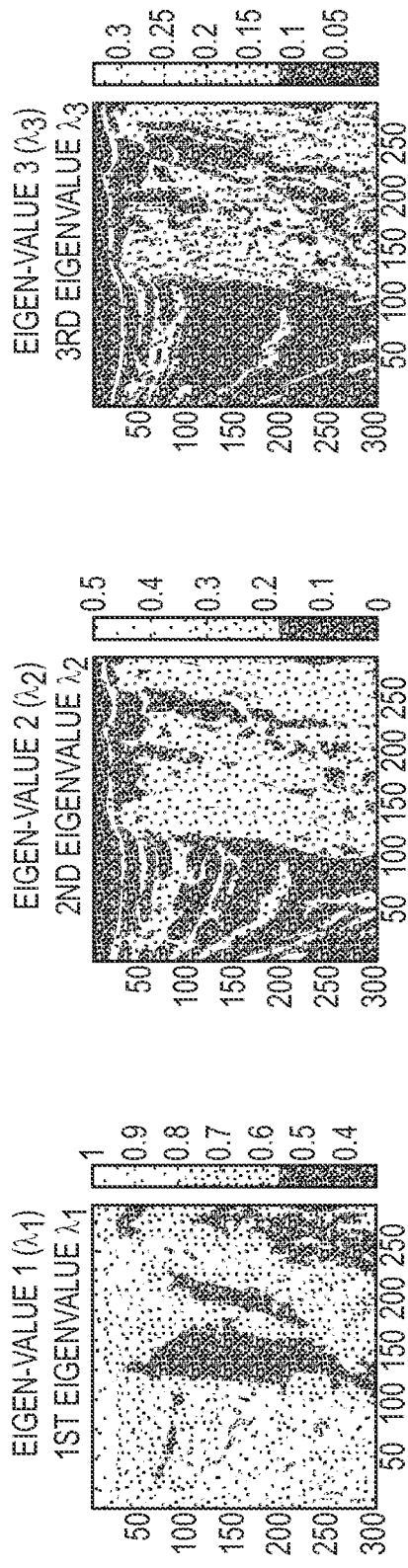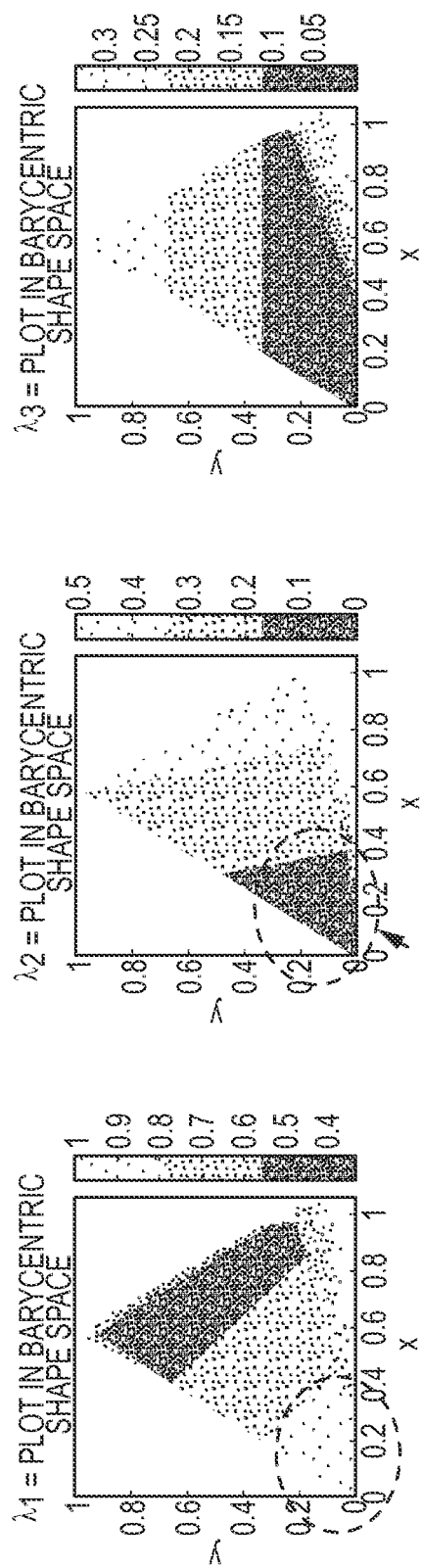
FIG. 13A   FIG. 13B   FIG. 13C

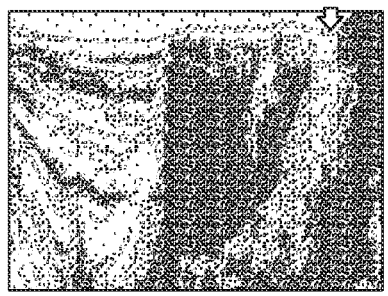
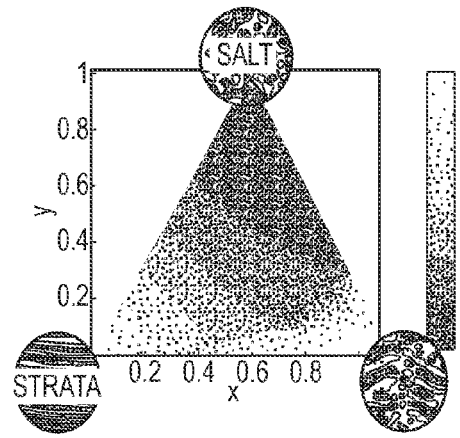
FIG.14A FIG.14B
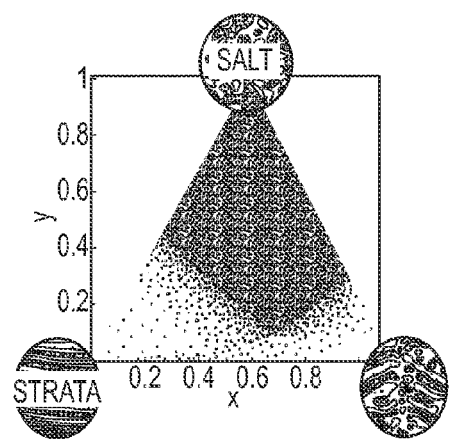
FIG.15A FIG.15B

METHODS OF ANALYZING SEISMIC DATA

BACKGROUND

Embodiments of the present invention relate to methods of analysing seismic data. Merely by way of example, in some embodiments, features of a subsection of the earth may be identified, images of a subsection of the earth and/or features in the subsection of the earth may be produced and/or parameters associated with the features may be determined.

The characterisation of subsurface regions (e.g., strata or salt bodies) in a geological volume is important for identifying, accessing and managing reservoirs. The depths and orientations of such regions can be determined, for example, by seismic surveying. This is generally performed by imparting energy to the earth at one or more source locations, for example, by way of controlled explosion, mechanical input etc. Return energy is then measured at surface receiver locations at varying distances and azimuths from the source location. The travel time of energy from source to receiver, via reflections and refractions from interfaces of subsurface regions, indicates the depth and orientation of the regions. Such a method provides a seismic attribute vector field (seismic data) with various attributes (e.g., amplitude) that can then be analysed to give information regarding the geological volume.

U.S. Pat. No. 7,248,539 discloses a method for automated extraction of surface primitives from seismic data. For example, one embodiment of the method of U.S. Pat. No. 7,248,539 involves defining, typically with sub-sample precision, positions of seismic horizons through an extrema representation of a 3D seismic input volume; deriving coefficients that represent the shape of the seismic waveform in the vicinity of the extrema positions; sorting the extrema positions into groups that have similar waveform shapes by applying classification techniques with the coefficients as input attributes using unsupervised or supervised classification based on an underlying statistical class model; and extracting surface primitives as surface segments that are both spatially continuous along the extrema of the seismic volume and continuous in class index in the classification volume.

Deepwater drilling is becoming more attractive, and major discoveries have been made in deepwater, subsalt environments. When exploring subsalt hydrocarbon plays, a proper model of the salt deposits can be of great importance, both for seismic depth imaging, and to identify salt related drilling hazards.

Salt body extraction from seismic is conventionally a slow and tedious process, mainly based on manual interpretation. The lack of a suitable methodology for salt extraction can be a major bottleneck in depth migration of seismic data. More generally, it can be difficult to distinguish between spatially coherent regions of the geological volume (such as stratified regions) and spatially incoherent regions of the geological volume (such as salt bodies).

SUMMARY

In one embodiment of the present invention, a method for characterisation of spatially coherent and/or incoherent regions of seismic data is provided.

In an embodiment, a method of analysing seismic data from a geological volume is provided. The geological volume is divided into a plurality of voxels. For each voxel a respective neighbourhood is defined which includes that voxel and a predetermined arrangement of neighbouring voxels. For each voxel, the respective normal vectors of a seismic attribute vector field derived from the seismic data are calculated. For each voxel, a respective local structure tensor based on the normal vectors of the voxels of the respective neighbourhood is calculated. For each voxel, the value of an expression which includes one or more of the eigenvalues ($\lambda_1$, $\lambda_2$, $\lambda_3$) of the respective local structure tensor is calculated. The method can be used for seismic surveying, or to manage operation of or drilling of a subterranean well.

Some embodiments of the present invention provide a method of analysing seismic data from a geological volume divided into a plurality of voxels, for each voxel a respective neighbourhood being defined which includes that voxel and a predetermined arrangement of neighbouring voxels, the method including the steps of: calculating, for each voxel, the respective normal vectors of a seismic attribute vector field derived from the seismic data; calculating, for each voxel, a respective local structure tensor based on the normal vectors of the voxels of the respective neighbourhood; and calculating, for each voxel, the value of an expression which includes one or more of the eigenvalues ($\lambda_1$, $\lambda_2$, $\lambda_3$) of the respective local structure tensor.

In embodiments of the present invention, the expression based on the eigenvalues can be used for distinguishing regions of the geological volume, such as salt bodies.

In some embodiments of the present invention, the eigenvalues may be normalised, e.g., such that $\lambda_1+\lambda_2+\lambda_3=1$. In some aspects, the expression may be reduced to just $\lambda_1$, $\lambda_2$ or $\lambda_3$. However, the expression may combine all the eigenvalues ($\lambda_1$, $\lambda_2$, $\lambda_3$) of the respective local structure tensor.

For example, the expression may be the squared Frobenius norm ($\|T\|_F^2$):

$$\|T\|_F^2 = \lambda_1^2 + \lambda_2^2 + \lambda_3^2 \quad [1]$$

or, the expression may be the fractional anisotropy (FA):

$$FA = \sqrt{\frac{(\lambda_1 - \lambda_2)^2 + (\lambda_2 - \lambda_3)^2 + (\lambda_1 - \lambda_3)^2}{2(\lambda_1^2 + \lambda_2^2 + \lambda_3^2)}} \quad [2]$$

$\|T\|_F^2$ and FA provide different weightings, FA being a more non-linear function of the three eigenvalues.

The expression may be an anisotropy shape metric for the eigenvalues. For example, anisotropy shape metrics may correspond to linear anisotropy of the eigenvalues, planar anisotropy of the eigenvalues, and isotropy of the eigenvalues. The shape metrics may be normalised. For example, normalised shape metrics may be:

$$C_l = \frac{\lambda_1 - \lambda_2}{\lambda_1 + \lambda_2 + \lambda_3} \quad [3]$$

$$C_p = \frac{2(\lambda_2 - \lambda_3)}{\lambda_1 + \lambda_2 + \lambda_3} \quad [3]$$

$$C_s = \frac{3\lambda_3}{\lambda_1 + \lambda_2 + \lambda_3} \quad [4]$$

where:
$C_l + C_p + C_s = 1$, and
$C_l$ = a linear shape metric,
$C_p$ = a planar shape metric, and
$C_s$ = a spherical shape metric.

Another possible anisotropy shape metric, in accordance with an embodiment of the present invention is:

$$C_{plane} = \frac{\lambda_1 - \lambda_2}{\lambda_1 + \lambda_2} \quad [5]$$

$C_{plane}$ being a normalized metric calculated from $\lambda_1$ and $\lambda_2$, and varying in the range from 0 to 1, where values tending to 0 are indicative of faults.

In some embodiments, the values of the expression can be used to distinguish spatially coherent regions of the geological volume from spatially incoherent regions of the geological volume, such as stratified regions from salt bodies. For example, $\|T\|_F^2$ and FA may be used to distinguish stratified regions from spatially incoherent regions (e.g., salt) and from terminations or salt diapir tops, $C_l$ and $C_{plane}$ may be used to identify faults, $C_p$ may be used to identify stratified regions, and $C_s$ may be used to identify spatially incoherent regions.

The method may further include the step of: displaying the values of the expression on a representation of at least part of the geological volume. For example, the values of the expression may be displayed on a cross section through the geological volume. The method may then further include the step of: thresholding the representation to change the contrast between regions of the representation with different values of the expression.

The method may further include the steps of: displaying a barycentric map having vertices corresponding to different anisotropy shape metrics of the eigenvalues; calculating, for each voxel, the values of the anisotropy shape metrics for the eigenvalues of that voxel, such that each voxel has a corresponding location on the map; and showing a population density distribution of the locations of the voxels on the map.

In some embodiments, the population density distribution of the locations of the voxels on the barycentric map can be a highly practical tool e.g., for intuitive interaction when thresholding a representation displaying the values of the expression. Thus, the method may further including the step of showing contours of the value of the expression on the map.

However, the population density distribution shown on the barycentric map may of itself convey useful information about the geological volume.

Thus, more generally, in certain aspects, a method is provided of analysing seismic data from a geological volume divided into a plurality of voxels, for each voxel a respective neighbourhood being defined which includes that voxel and a predetermined arrangement of neighbouring voxels, the method including the steps of: calculating, for each voxel, the respective normal vectors of a seismic attribute vector field derived from the seismic data; calculating, for each voxel, a respective local structure tensor based on the normal vectors of the voxels of the respective neighbourhood; displaying a barycentric map having vertices corresponding to different anisotropy shape metrics of the eigenvalues of the respective local structure tensor; calculating, for each voxel, the values of the anisotropy shape metrics for the eigenvalues of that voxel, such that each voxel has a corresponding location on the map; and showing a population density distribution of the corresponding locations of the voxels on the map.

In some embodiments, the anisotropy shape metrics used in relation to the barycentric map may correspond to linear anisotropy of the eigenvalues, planar anisotropy of the eigenvalues, and isotropy of the eigenvalues. The shape metrics may be normalised, and may for example be $C_l$, $C_p$ and $C_s$ as defined in expressions [3] to [5] above. If, in the method of the first aspect, a particular anisotropy shape metric is used as a vertex of the barycentric map and is also used as the expression, it does not need to be calculated separately twice, i.e., the step of calculating the value of the expression can be included in the step of calculating the values of the anisotropy shape metrics.

Certain embodiments provide a method to evaluate an update of a migration velocity model including the steps of: performing the method of the first or second aspect of the invention before and after updating the migration velocity model; and using the results of the performed method to identify regions where the re-migrated seismic data have become more spatially coherent and regions where the re-migrated seismic data have become less spatially coherent.

A further aspect provides a method of operating a well including the steps of: performing the method of the first or second aspect of the invention; and using the results of the method to manage the operation of the well.

A yet further aspect provides a method of drilling a well including the steps of performing the method of the first or second aspect of the invention; and using the results of the method to manage the drilling of the well.

In some embodiments, a computer program comprising code and/or a computer readable medium storing a computer program comprising code may be used to perform the methods described herein. For example, in accordance with an embodiment of the present invention, a computer system may be provided for analysing seismic data from a geological volume divided into a plurality of voxels, for each voxel a respective neighbourhood being defined which includes that voxel and a predetermined arrangement of neighbouring voxels, the system including: one or more processors configured to: calculate, for each voxel, the respective normal vectors of a seismic attribute vector field derived from the seismic data; calculate, for each voxel, a respective local structure tensor based on the normal vectors of the voxels of the respective neighbourhood; and calculate, for each voxel, the value of an expression which includes one or more of the eigenvalues ($\lambda_1$, $\lambda_2$, $\lambda_3$) of the respective local structure tensor.

In another example, a computer system may be provided for analysing seismic data from a geological volume divided into a plurality of voxels, for each voxel a respective neighbourhood being defined which includes that voxel and a predetermined arrangement of neighbouring voxels, the system including: one or more processors configured to: calculate, for each voxel, the respective normal vectors of a seismic attribute vector field derived from the seismic data; calculate, for each voxel, a respective local structure tensor based on the normal vectors of the voxels of the respective neighbourhood; display a barycentric map having vertices corresponding to different anisotropy shape metrics of the eigenvalues of the respective local structure tensor; calculate, for each voxel, the values of the anisotropy shape metrics for the eigenvalues of that voxel, such that each voxel has a corresponding location on the map; and show a population density distribution of the corresponding locations of the voxels on the map. The system may further include: a computer-readable medium or media operatively connected to the processors, the medium or media storing the locations of the voxels within the geological volume, and storing the seismic data. The system may further include: a display device for displaying the values of the expression on the representation of at least part of the geological volume, and/or for displaying the barycentric map and the population density distribution.

Further optional features of embodiments of the present invention will now be set out. These are applicable singly or in any combination with any aspec/embodiment of the invention.

For each voxel, the respective neighbourhood may be a cube or cuboid of voxels centred on that voxel. For example, the cube may be a 3×3×3, 5×5×5 or 7×7×7 cube. The cuboid may be a 1×3×3 or 3×3×5 cuboid.

The local structure tensor T may be:

$$T = \frac{1}{N} \begin{bmatrix} \sum (x_i)^2 & \sum x_i y_i & \sum x_i z_i \\ \sum x_i y_i & \sum (y_i)^2 & \sum y_i z_i \\ \sum x_i z_i & \sum y_i z_i & \sum (z_i)^2 \end{bmatrix} \quad [6]$$

where: there are N voxels in each neighbourhood, $n_i = (x_i, y_i, z_i)$ are the normal vectors for each voxel, i=1, 2, ..., N, and the summations are over i. In the case where the geological domain is two-dimensional (a cross-section), the local structure tensor reduces to a 2-by-2 matrix.

The seismic attribute vector field may be a vector field of seismic gradient, or seismic second or higher order derivative. However, in the case of second and higher order derivatives, the characterisation is in regard of spatially coherent and/or incoherent regions in the next lower order derivative rather than in the seismic amplitude.

The method may further include, before the step of calculating the normal vectors, a step of: calculating the seismic attribute vector field from a seismic amplitude field obtained from the seismic data.

The method may further include the initial step of: defining, for each voxel, the respective neighbourhood.

The method may further include the initial step of: performing an analysis of the results of seismic testing to generate the seismic data. Indeed, the method may then further include the initial step of: performing the seismic testing.

Further optional features of the invention are set out below.

BRIEF DESCRIPTION OF THE DRAWINGS

Embodiments of the invention will now be described by way of example with reference to the accompanying drawings in which:

FIG. 4 shows representative seismic amplitude cross-sections for (a) a stratified region, (b) a faulted region or region of stratified layer terminations, and (c) a salt region or region of noise, in accordance with an embodiment of the present invention;

FIG. 5 illustrates anisotropy shape metrics corresponding to the limit cases for linear anisotropy $C_1$, =1 planar anisotropy $C_p = 1$, and isotropy $C_s = 1$, in accordance with an embodiment of the present invention;

FIG. 6 illustrates how location on a barycentric map represents different relative values of $C_1$, $C_p$, and $C_s$ by mapping shapes corresponding to those different relative values, in accordance with an embodiment of the present invention;

FIG. 11 shows the cross-section of FIG. 8 and a corresponding population density distribution map, both showing contoured values of (a) $\lambda_1$, (b) $\lambda_2$ and (c) $\lambda_3$, in accordance with an embodiment of the present invention;

FIG. 12 shows the cross-section and map of FIG. 11 with different contours for (a) $\lambda_1$, (b) $\lambda_2$ and (c) $\lambda_3$ based on four value ranges, in accordance with an embodiment of the present invention;

FIG. 13 shows the cross-section and map of FIG. 11 with different contours for (a) $\lambda_1$, (b) $\lambda_2$ and (c) $\lambda_3$ based on three ranges, in accordance with an embodiment of the present invention;

FIG. 14 shows (a) the cross-section of FIG. 8 and (b) a corresponding population density distribution map, both showing contoured values of the squared Frobenius norm, in accordance with an embodiment of the present invention;

FIG. 15 shows (a) the cross-section of FIG. 8 and (b) a corresponding population density distribution map, both showing contoured values of the fractional anisotropy, in accordance with an embodiment of the present invention.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the scope of the invention.

Specific details are given in the following description to provide a thorough understanding of the embodiments. However, it will be understood by one of ordinary skill in the art that embodiments maybe practiced without these specific details. For example, well-known circuits, processes, algorithms, structures, and techniques may be shown without unnecessary detail in order to avoid obscuring the embodiments.

As disclosed herein, the term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

In the present invention, seismic data obtained by seismic testing of a geological volume is analysed to characterise subsurface regions (e.g., strata or salt bodies) which can be important for identifying, accessing and managing reservoirs. In particular, by using a vector field derived from the data, a locally consistent set of normal vectors to strata can be generated, whereas in salt regions, the normal vectors have no preferred orientation.

Figure 1:
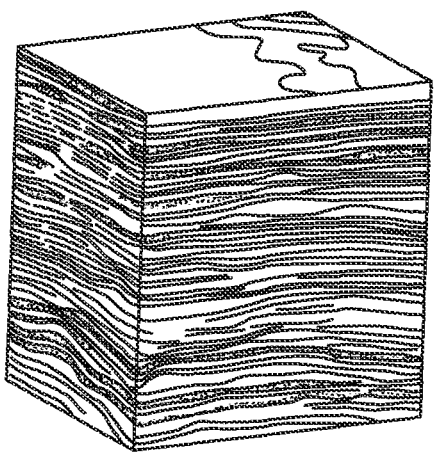
FIG. 1 shows an example geological volume in the form of a cube of seismic amplitude data.

FIG. 1 shows an example geological volume in the form of a cube of seismic amplitude data. The seismic attribute vector field derived from the seismic data is typically a vector field of seismic gradient.

To calculate normal vector fields, a polynomial reconstruction (as discussed in WO 98/37437) of the seismic amplitude can be used. This enables the calculation of analytical derivatives in normal directions (e.g., inline, crossline, vertical). The vector field of first order derivatives is referred to as the gradient of the seismic attribute, and represents the direction of steepest ascent/descent in terms of amplitude. Assuming that there exists a sub-horizontal layer structure in the seismic data, represented by iso-surfaces, the derivatives can be used to construct representative normal vectors to the iso-surfaces. Appropriate iso-surfaces can be the zero values of the seismic amplitude and the zero values of the vertical derivative of the amplitude (the latter are referred to as extrema surfaces (see e.g., U.S. Pat. No. 7,248,539). For consistency, upwards pointing vectors may be chosen, and the vectors normalized to unit length.

Figure 2:
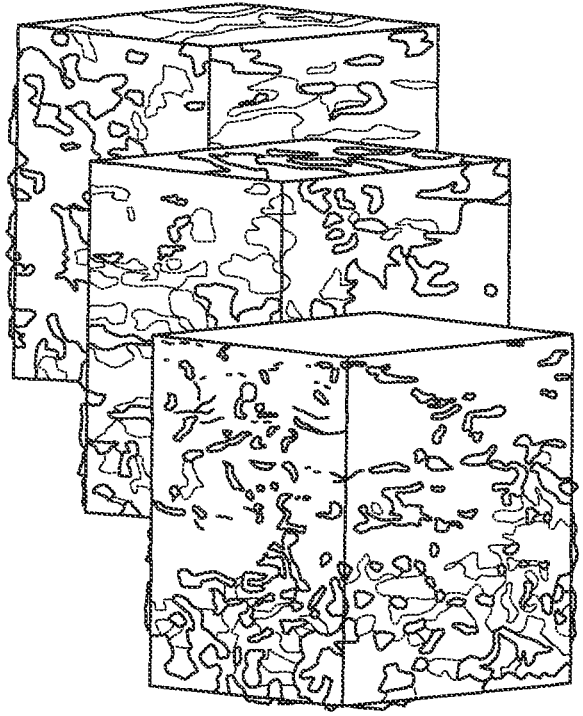
FIG. 2 shows the respective magnitudes of three normal vector fields derived from the seismic amplitude data of FIG. 1.

An example of normal vector fields for the geological volume of FIG. 1 is provided in FIG. 2, which shows three representations of the geological volume of FIG. 1, each representation being the magnitude of the normal vector field for a different orientation (inline, crossline or vertical).

In order to analyse local variations in the normal vector fields at a given scale, the geological volume is divided into voxels of a predetermined size, each voxel being associated with the respective local normal vectors. A neighbourhood around each voxel is also defined. In each neighbourhood of N voxels, the normal vectors $n_i = (x_i, y_i, z_i)$, $i = 1, 2, \ldots, N$ are then used to form a local structure tensor, T, as described above in equation $$T = \frac{1}{N} \begin{bmatrix} \sum (x_i)^2 & \sum x_i y_i & \sum x_i z_i \\ \sum x_i y_i & \sum (y_i)^2 & \sum y_i z_i \\ \sum x_i z_i & \sum y_i z_i & \sum (z_i)^2 \end{bmatrix}. \quad [6]$$

For each voxel, the respective neighbourhood may be a cube of voxels centred on that voxel. A user can select the size of the neighbourhood depending on the scale of the features that they wish to identify. A neighbourhood can be any size or shape. For example, a neighbourhood may be a cube (e.g., 3×3×3, 5×5×5 or 7×7×7) or a cuboid (e.g., 3×3×5 or 3×3×1). When the geological domain is two-dimensional—a cross-section, for example—the local structure tensor reduces to a 2-by-2 matrix.

The structure tensor is analysed in terms of principal directions (eigenvectors) and their weights (eigenvalues $\lambda_1$, $\lambda_2$, $\lambda_3$). The eigenvalues may be normalized and coupled (e.g., such that $\lambda_1 + \lambda_2 + \lambda_3 = 1$) so that the calculation of any two eigenvalues can be used to obtain the third eigenvalue.

More particularly, the eigenvalues of the structure tensor can reveal useful information regarding the geological volume, and thus are used in an expression to analyse and, typically, display the geological volume.

Figure 3:
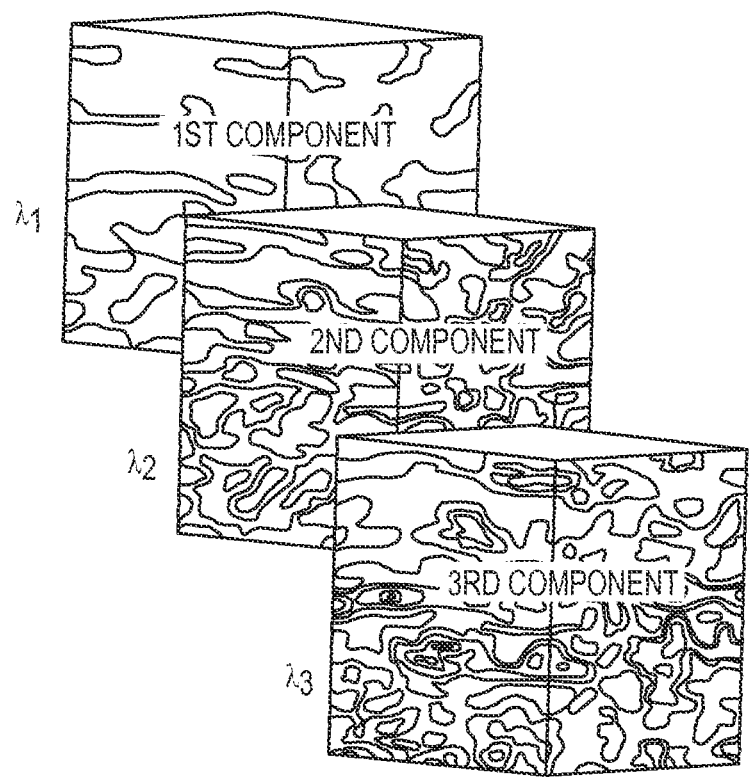
FIG. 3 displays the values of normalised eigenvalues, $\lambda_1$, $\lambda_2$ or $\lambda_3$, on respective representations of the geological volume of FIGS. 1 and 2.

At its simplest, the expression may be just $\lambda_1$, $\lambda_2$ or $\lambda_3$. In FIG. 3, the values of the normalised eigenvalues, $\lambda_1$, $\lambda_2$ or $\lambda_3$, are displayed on respective representations of the geological volume of FIGS. 1 and 2.

However, the expression may advantageously combine some or all of the eigenvalues. In particular, different regions of a geological volume may be characterised by different relative values of the eigenvalues. FIG. 4 shows representative seismic amplitude cross-sections for (a) a stratified region, (b) a faulted region or region of stratified layer terminations, and (c) a salt region or region of noise. In stratified regions (a), there is one dominating direction of the eigenvectors (e.g., $\lambda_1 \approx 1$, $\lambda_2 \approx \lambda_3 \approx 0$). In the chaotic regions (c), there is no preferred orientation (e.g., $\lambda_1 \approx \lambda_2 \approx \lambda_3 \approx 1/3$). Other limiting cases are regions where two almost orthogonal directions are represented (e.g., $\lambda_1 \approx \lambda_2 \approx 1/2$, $\lambda_3 \approx 0$), e.g., salt diapir tops, and regions where chaos meets stratification (e.g., $\lambda_1 \approx 2/3$, $\lambda_2 \approx \lambda_3 \approx 1/6$), e.g., terminations. The use of unit normal vectors implies that the eigenvalues sum to unity.

The squared Frobenius norm ($\|T\|_F^2$) of the structure tensor, which can be defined as the sum of the squares of the eigenvalues (see equation $\|T\|_F^2 = \lambda_1^2 + \lambda_2^2 + \lambda_3^2$ [1] above), is a convenient measure of the eigenvalue distribution and may be used as the expression to analyze the geological volume. Advantageously, the squared Frobenius norm can be calculated as the sum of the diagonal elements of the square of the structure tensor, T, so no explicit eigenvalue decomposition is required. Furthermore, it can discriminate between stratified regions (e.g., $\lambda_1 \approx 1$, $\lambda_2 \approx \lambda_3 \approx 0$, for which the squared Frobenius norm is $\approx 1$), chaos/salt (e.g., $\lambda_1 \approx \lambda_2 \approx \lambda_3 \approx 1/3$, for which the squared Frobenius norm is $\approx 1/3$) and terminations/salt diapir tops (e.g., $\lambda_1 \approx \lambda_2 \approx 1/2$, $\lambda_3 \approx 0$ or $\lambda_1 \approx 2/3$, $\lambda_2 \approx \lambda_3 \approx 1/6$, for which the squared Frobenius norm is $\approx 1/2$). For convenience, the squared Frobenius norm can be rescaled so that it is +1 in regions indicating chaos/salt, −1 where it suggests strata and 0 where it indicates a transition region or terminations of the strata against salt.

Another option for the expression is the fractional anisotropy (FA), as defined above in equation $$FA = \sqrt{\frac{(\lambda_1 - \lambda_2)^2 + (\lambda_2 - \lambda_3)^2 + (\lambda_1 - \lambda_3)^2}{2(\lambda_1^2 + \lambda_2^2 + \lambda_3^2)}}. \quad [2].$$

The fractional anisotropy applies a different weighting to the eigenvalues compared to that of the Frobenius norm.

Anisotropy shape metrics for the eigenvalues may also be obtained. Suitable normalised anisotropy shape metrics corresponding to linear anisotropy $C_l$, planar anisotropy $C_p$, and isotropy $C_s$ are provided in equations [3] to [5] above. These anisotropy shape metrics are illustrated in FIG. 5.

The values of such shape metrics at the respective voxels can provide information about the type of region in which the voxel is located. For example, a high value for $C_l$ tends to be associated with stratified regions, and a high value $C_s$ tends to be associated with chaotic (e.g., salt) regions. However, the relative values of $C_l$, $C_p$, and $C_s$ can be particularly revealing, especially when used in conjunction with a barycentric map (also known as a ternary plot).

The barycentric map is typically represented as an equilateral triangle having vertices corresponding to the different anisotropy shape metrics. As each voxel has values of $\lambda_1$, $\lambda_2$ or $\lambda_3$ which provide corresponding values of $C_l$, $C_p$ and $C_s$, each voxel has a location on the map, which location represents the relative values of $C_l$, $C_p$, and $C_s$ at the voxel. For example, if a voxel has a relatively large value of $C_l$ but values of $C_p$ and $C_s$ which are close to zero, then its location on the map will be close to the $C_l$ vertex. FIG. 6(a) illustrates how location on the map represents different relative values of $C_l$, $C_p$, and $C_s$ by mapping shapes corresponding to those different relative values, pure $C_l=1$ being at the bottom left vertex, pure $C_p=1$ being at the bottom right vertex, and pure $C_s=1$ being at the top vertex.

Figure 7A:
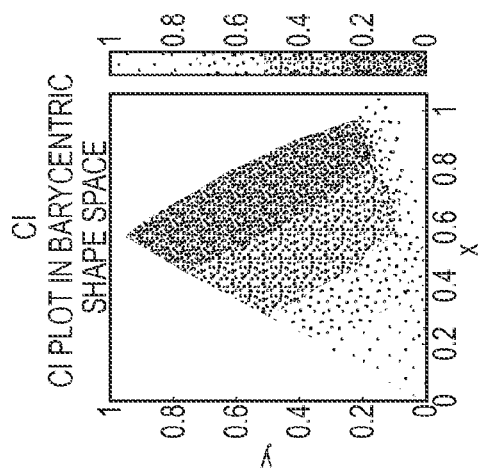
FIG. 7 shows, for an example geological volume, the same population density distribution plotted on three barycentric maps (a) to (c), in accordance with an embodiment of the present invention.
Figure 7C:
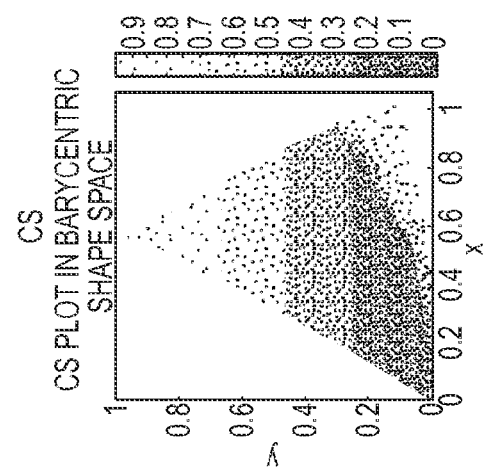
Figure 7B:
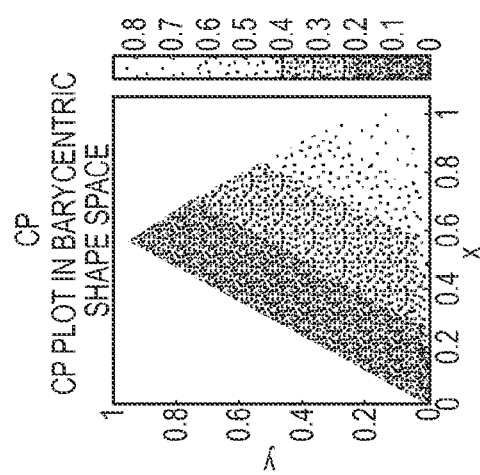

It follows that, for a given geological volume, a population density distribution can be plotted on the barycentric map, a high density at a given location on the map meaning that relatively high numbers of voxels from the volume have values for $C_l$, $C_p$ and $C_s$ corresponding to that location. For example, FIG. 7 shows, for an example geological volume, the same population density distribution plotted on three barycentric maps (a) to (c). Each voxel is represented by a point speckle on each map, so that the population density is the speckle density. In map (a) the speckles are colour-coded to provide contours of equal relative $C_l$, in map (b) the speckles are colour-coded to provide contours of equal relative $C_p$, and in map (c) the speckles are colour-coded to provide contours of equal relative $C_s$. However, as discussed below, other metrics, such as the squared Frobenius norm and the fractional anisotropy, can also usefully be contoured on such a population density distribution.

Advantageously, the population density distribution can be used to distinguish spatially-coherent regions of the geological volume from spatially incoherent regions of the geological volume. This information can then be used e.g., for seismic surveying, or to manage operation or drilling of a subterranean well.

Figure 8:
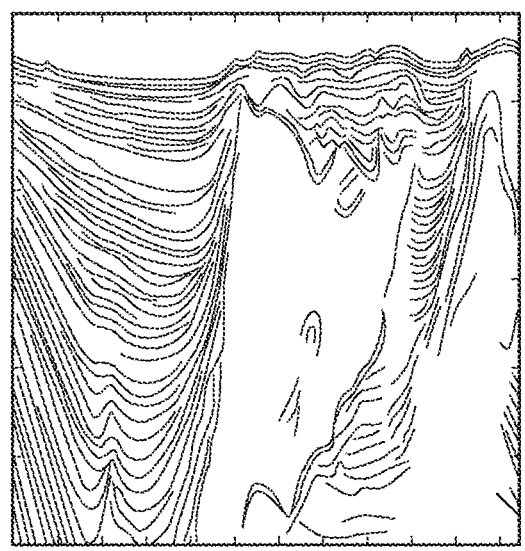
FIG. 8 shows a grey scale seismic amplitude cross-section of a geological volume, in accordance with an embodiment of the present invention.
Figure 9A:
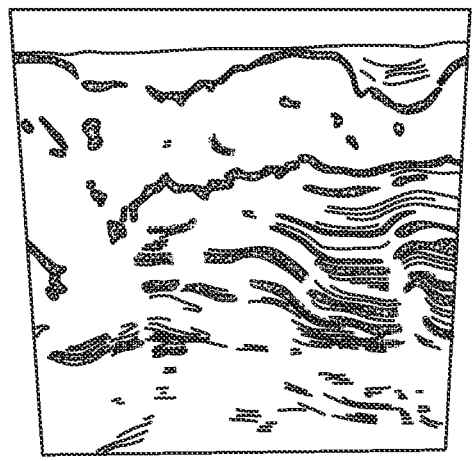
FIG. 9 shows (a) a seismic amplitude cross-section, and (b) a corresponding barycentric population density distributions for the relative values of $C_1$, $C_p$, and $C_s$ of the voxels of that cross-section, in accordance with an embodiment of the present invention.
Figure 9B:
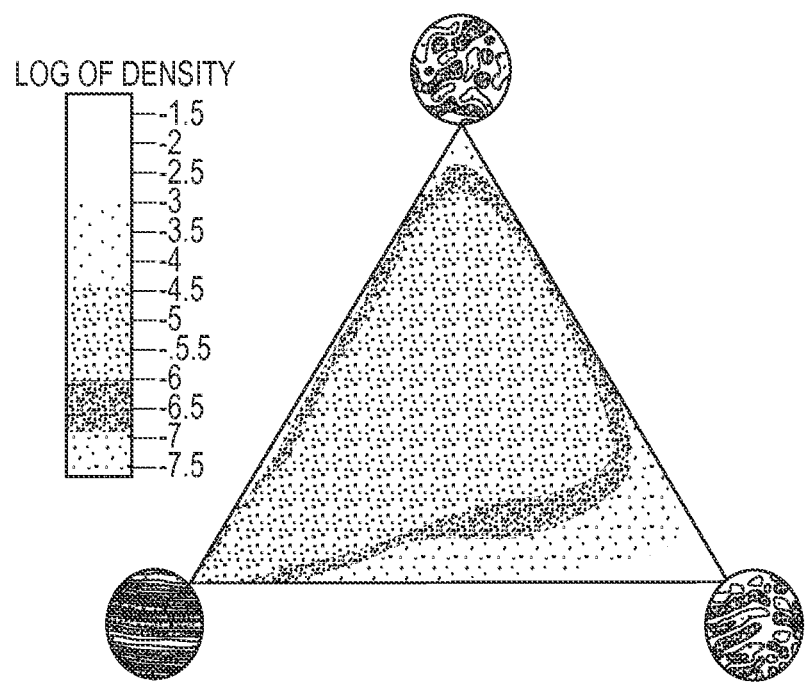
Figure 10:
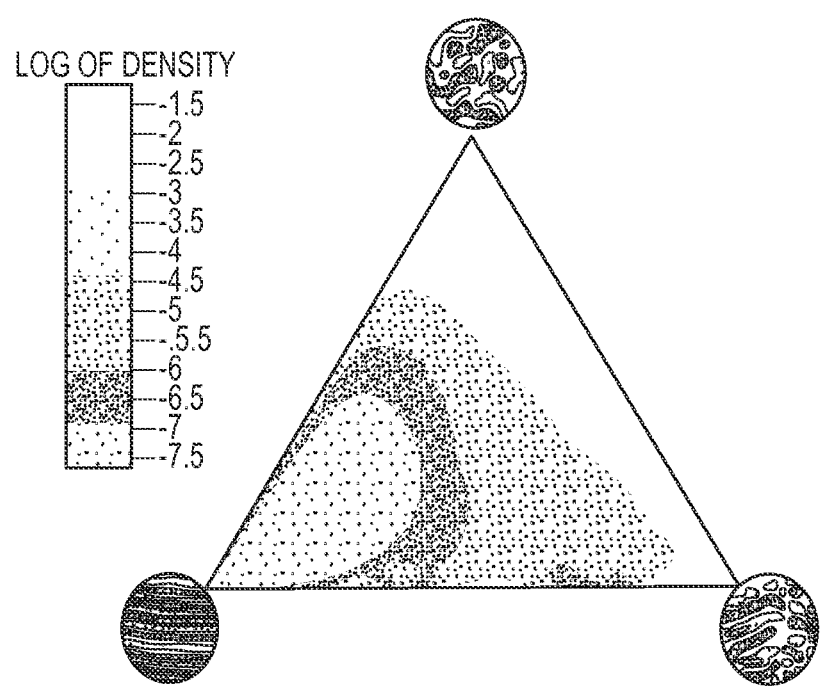
FIG. 10 shows a barycentric population density distribution for the relative values of $C_1$, $C_p$, and $C_s$ of the voxels of another seismic amplitude cross-section, in accordance with an embodiment of the present invention.

For example, FIG. 8 shows a seismic amplitude cross-section of a geological volume. Regions of strata are mainly to the left hand side in the cross-section, and salt regions are mainly to the right hand side in the cross-section. FIG. 9(a) shows a seismic amplitude cross-section through the volume, the cross-section having relatively few stratified regions and relatively many chaotic regions, and FIG. 9(b) shows the corresponding barycentric population density distribution for the relative values of $C_l$, $C_p$, and $C_s$ of the voxels of the cross-section, the population density distribution being contoured according to population density. FIG. 10 shows a barycentric population density distribution for the relative values of $C_l$, $C_p$, and $C_s$ of the voxels of a different cross-section through the volume of FIG. 8, the cross-section having more stratified regions and fewer chaotic regions than the cross-section of FIG. 9(a). The change in amounts of stratified and chaotic regions is reflected in the population density distribution of FIG. 9(b) showing significant amounts of $C_s=1$ (top vertex), while the population density distribution of FIG. 10 is skewed heavily towards $C_l=1$ (bottom left vertex). Thus analysing the seismic data in this way provides a useful and powerful way of distinguishing between spatially coherent (e.g., stratified) regions of a geological volume and spatially incoherent (e.g., salt body) regions of the geological volume.

The barycentric population density distribution maps are also useful tools for determining threshold levels in representations (e.g., seismic volumes and cross-sections) showing values of expressions, such as $\lambda_1$, $\lambda_2$ or $\lambda_3$, $C_l$, $C_p$, $C_s$, $C_{plane}$, $\|T\|_F^2$ and FA. FIG. 11 shows the same cross-section as FIG. 8 and a corresponding barycentric population density distribution map, but both showing contoured values of (a) $\lambda_1$, (b) $\lambda_2$ and (c) $\lambda_3$. The regions of strata are best distinguished from salt regions by $\lambda_1$ and $\lambda_2$. FIGS. 12(a) to (c) show the same cross-section and population density distribution map, but with a different contouring scheme which enhances the discrimination of strata regions from salt regions by adopting contouring based on four value ranges. FIGS. 13(a) to (c) also show the same cross-section and population density distribution map, but with a contouring scheme which enhances the discrimination of strata regions from salt regions by adopting contouring based on just three value ranges.

FIG. 14 shows (a) the cross-section of FIG. 8 and (b) a corresponding barycentric population density distribution map, but both now showing contoured values of the squared Frobenius norm. Similarly FIG. 15 shows (a) the cross-section of FIG. 8 and (b) a corresponding population density distribution map, but both showing contoured values of the fractional anisotropy. In each case, there is good discrimination of strata regions from salt regions and the respective population density distribution map can be used to set suitable thresholds. However, the iso-contours of the two metrics are slightly different, due to the different weightings provided by the squared Frobenius norm and the fractional anisotropy.

Figure 16A:
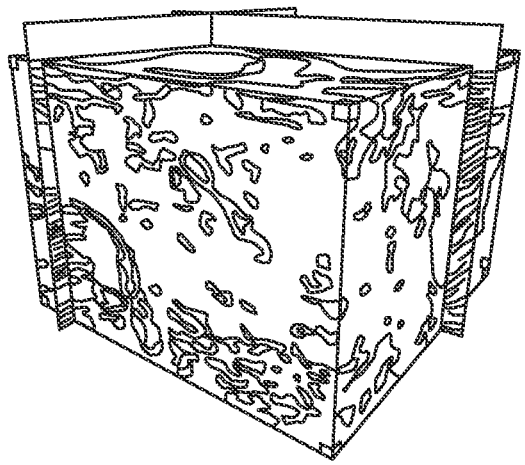
FIG. 16 shows (a) a seismic cube overlaid on its faces with colour-coded contours corresponding to values deduced from $C_1$ and $C_p$, (b) a projection of all the voxels in the cube onto a barycentric map, and (c) a volume rendered representation of the cube in which only voxels which have locations in a selected area of the map are displayed, in accordance with an embodiment of the present invention.
Figure 16B:
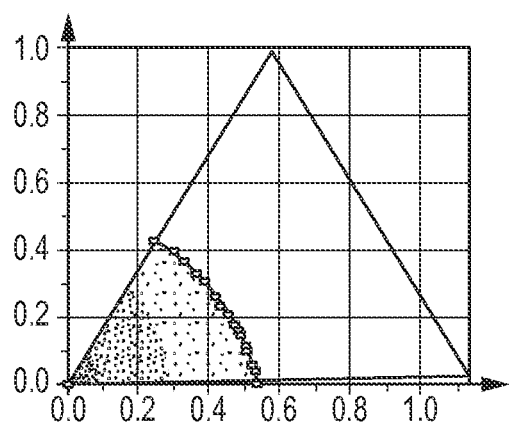
Figure 16C:
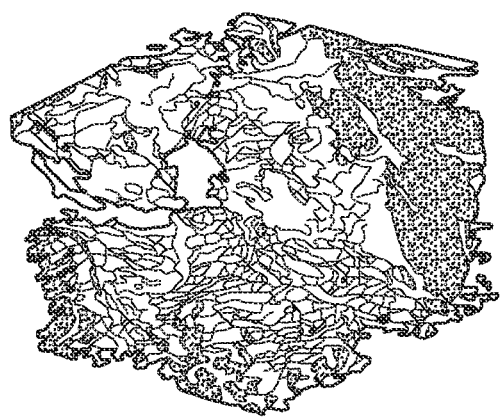

Volume rendering can also be facilitated using a barycentric population density distribution map to set suitable contour threshold levels. FIG. 16(a) shows a seismic cube overlaid on its faces with colour-coded contours corresponding to values deduced from $C_l$ and $C_p$, and FIG. 16(b) shows a projection of all the voxels in the cube onto a barycentric map. An area at the bottom left hand corner of the map is selected, and as shown in FIG. 16(c), a volume rendered representation of the cube can then be generated in which only voxels which have corresponding locations in the selected area of the map are displayed. The choice of displayed voxels can be readily and intuitively changed by moving the boundary of the selected area on the map.

The methods discussed above can be usefully applied to the evaluation of migration velocity model updates. For example, the methods can be used before and after an update of the migration velocity model to determine regions where the re-migrated seismic data have become more spatially coherent and regions where the re-migrated seismic data have become less spatially coherent.

In summary, the use of expressions (such as $\lambda_1, \lambda_2$ or $\lambda_3$, $C_1$, $C_p$, $C_s$, $C_{plane}$, $\|T\|_F^2$ and FA) based on the eigenvalues of local structure tensors facilitates the characterisation of geological volumes, for example by helping to distinguish spatially coherent regions from spatially incoherent regions. Further, anisotropy shape metrics based on the eigenvalues of local structure tensors can be used to produce population density distributions on barycentric maps. Such distributions can also help in the characterisation of geological volumes, particularly when used as a tool to facilitate thresholding in representations (e.g., 2D cross-sections or 3D renderings) of the volume.

All references referred to above are hereby incorporated by reference for all purposes.

What is claimed is:

1. A method of analysing seismic data from a geological volume divided into a plurality of voxels, for each voxel a respective neighbourhood being defined that includes that voxel and a predetermined arrangement of neighbouring voxels, the method including the steps of:
    calculating, for each voxel, the respective normal vectors of a seismic attribute vector field derived from the seismic data;
    calculating, for each voxel, a respective local structure tensor based on the normal vectors of the voxels of the respective neighbourhood;
    displaying a barycentric map having vertices corresponding to different anisotropy shape metrics of eigenvalues of the respective local structure tensor;
    calculating, for each voxel, the values of the anisotropy shape metrics for the eigenvalues of that voxel, such that each voxel has a corresponding location on the map; and
    showing a population density distribution of the corresponding locations of the voxels on the map.

2. A method of analysing seismic data according to claim 1, wherein the anisotropy shape metrics correspond to linear anisotropy of the eigenvalues, planar anisotropy of the eigenvalues, and isotropy of the eigenvalues.

3. A method of analysing seismic data according to claim 1, wherein, for each voxel, the respective neighbourhood is a cube or cuboid of voxels centred on that voxel.

4. A method of analysing seismic data according to claim 1, wherein the seismic attribute vector field is a vector field of seismic gradient, or seismic second or higher order derivative.

5. A method of analysing seismic data according to claim 1, further comprising:
    defining, for each voxel, the respective neighbourhood.

6. A method of analysing seismic data according to claim 1, further comprising:
    performing an analysis of the results of seismic testing to generate the seismic data.

7. A method of analysing seismic data according to claim 6, further comprising:
    performing the seismic testing.

8. A method of operating a well including the steps of:
    performing the method of claim 1; and
    using the results of the method to manage the operation of the well.

9. A method of drilling a well including the steps of:
    performing the method of claim 1; and
    using the results of the method to manage the drilling of the well.

10. A method of analysing seismic data according to claim 1 further including the step of:
    calculating, for each voxel, the value of an expression that includes one or more of the eigenvalues ($\lambda_1, \lambda_2, \lambda_3$) of the respective local structure tensor.

11. A method of analysing seismic data according to claim 10, further including the step of:
    showing contours of the value of the expression on the map.

12. A method of analysing seismic data according to claim 10, wherein the expression combines all the eigenvalues ($\lambda_1, \lambda_2, \lambda_3$) of the respective local structure tensor.

13. A method of analysing seismic data according to claim 10, further including the step of:
    using the values of the expression to distinguish spatially coherent regions of the geological volume from spatially incoherent regions of the geological volume.

14. A method of analysing seismic data according to claim 10, further including the step of:
    displaying the values of the expression on a representation of at least part of the geological volume.

15. A computer system for analysing seismic data from a geological volume divided into a plurality of voxels, for each voxel a respective neighbourhood being defined that includes that voxel and a predetermined arrangement of neighbouring voxels, the system including one or more computer processors configured to:
    calculate, for each voxel, the respective normal vectors of a seismic attribute vector field derived from the seismic data;
    calculate, for each voxel, a respective local structure tensor based on the normal vectors of the voxels of the respective neighbourhood;
    display a barycentric map having vertices corresponding to different anisotropy shape metrics of eigenvalues of the respective local structure tensor;
    calculate, for each voxel, the values of the anisotropy shape metrics for the eigenvalues of that voxel, such that each voxel has a corresponding location on the map; and
    show a population density distribution of the corresponding locations of the voxels on the map.

* * * * *